US007692681B2

(12) United States Patent
Rengaraju et al.

(10) Patent No.: US 7,692,681 B2
(45) Date of Patent: Apr. 6, 2010

(54) IMAGE AND AUDIO CONTROLS FOR A COMMUNICATION DEVICE IN PUSH-TO-VIDEO SERVICES

(75) Inventors: Ganesan Rengaraju, Oak Park, IL (US); Tomasz Jamrozy, Naperville, IL (US); Gary J. Oswald, Elk Grove, IL (US); Lawrence A. Willis, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 1060 days.

(21) Appl. No.: 10/966,775

(22) Filed: Oct. 15, 2004

(65) Prior Publication Data

US 2006/0082641 A1 Apr. 20, 2006

(51) Int. Cl.
*H04N 7/14* (2006.01)
*H04B 7/00* (2006.01)

(52) U.S. Cl. ............... 348/14.08; 348/14.01; 348/14.02

(58) Field of Classification Search ... 348/14.01–14.09, 348/14.1, 14.11, 14.12, 14.13, 14.14; 455/518, 455/90.2, 519; 370/296
See application file for complete search history.

(56) References Cited

U.S. PATENT DOCUMENTS 6,128,649 A * 10/2000 Smith et al. ................. 709/217
7,133,062 B2 * 11/2006 Castles et al. ............ 348/14.03
2006/0031368 A1 * 2/2006 deCone ...................... 709/207
2006/0055771 A1 * 3/2006 Kies ........................ 348/14.03
2006/0080407 A1 * 4/2006 Rengaraju .................. 709/219

FOREIGN PATENT DOCUMENTS

JP 407162821 A * 6/1995
WO WO 99/63773 12/1999

OTHER PUBLICATIONS

Stubbs; Dynamic Allocation of Radio resources in a packet switched communications system; Dec. 9, 1999; W099/63773.*
"Comverse Demonstrates Push to Show™ Video "Walkie-Talkie" Service Using IP Multimedia Subsystem (IMS) Capabilities As part of Its Total Communication Portfolio", http://ww.cmvt.com/news2.asp?id=3&newsid=671, one page.

* cited by examiner

*Primary Examiner*—Melur Ramakrishnaiah
(74) *Attorney, Agent, or Firm*—Hisashi D. Watanabe

(57) ABSTRACT

A method (300) and an apparatus (110) for a communication device for controlling an image portion and an audio portion of a push-to-video communication are disclosed. The communication device (110) initiates the push-to-video communication (304), establishes the push-to-video communication (306), transmits the image portion and the audio portion of the push-to-video communication (308), and makes control of at least one of the image and audio portions of the push-to-video communication available (310) for other communication devices involved in the push-to-video communication. The communication device (110), after making the control of at least one of the image and audio portions of the push-to-video communication available, continues to transmit the corresponding portions of the push-to-video communication (312). The communication device (110) relinquishes the control when one of the other communication devices takes the control.

16 Claims, 4 Drawing Sheets

302 START
304 INITIATE PUSH-TO-VIDEO COMMUNICATION
306 ESTABLISH PUSH-TO-VIDEO COMMUNICATION WITH OTHER DEVICES
308 TRANSMIT IMAGE AND AUDIO PORTIONS OF PUSH-TO-VIDEO COMMUNICATION
310 MAKE AVAILABLE CONTROL OF AT LEAST ONE OF IMAGE AND AUDIO PORTIONS OF PUSH-TO-VIDEO COMMUNICATION
312 CONTINUE TRANSMITTING IMAGE AND AUDIO PORTIONS OF PUSH-TO-VIDEO COMMUNICATION
314 RELINQUISH CONTROL OF AT LEAST ONE OF IMAGE AND AUDIO PORTIONS OF PUSH-TO-VIDEO COMMUNICATION
316 TERMINATE TRANSMISSION OF CORRESPONDING PORTION OF PUSH-TO-VIDEO COMMUNICATION
318 RECEIVE CORRESPONDING PORTION OF PUSH-TO-VIDEO COMMUNICATION
320 END
300

100
THE CAR IS WELL-MAINTAINED
122
118
A:PARTY A
V:PARTY A
124
112
120
116
108
NETWORK
104
122
THE CAR IS WELL-MAINTAINED
118
A:PARTY A
V:PARTY A
124
118
A:PARTY A
V:PARTY A
124
110
122
THE CAR IS WELL-MAINTAINED
114
102
106

100
118
A:PARTY B
V:PARTY A
124
112
122
WILL YOU SHOW THE INTERIOR?
120
116
108
NETWORK
104
122
WILL YOU SHOW THE INTERIOR?
122
WILL YOU SHOW THE INTERIOR?
118
A:PARTY B
V:PARTY A
124
110
118
A:PARTY B
V:PARTY A
124
114
102
106

IMAGE AND AUDIO CONTROLS FOR A COMMUNICATION DEVICE IN PUSH-TO-VIDEO SERVICES

FIELD OF THE INVENTION

The present invention generally relates to push-to-video services, and more specifically to controlling of audio and video portions of a push-to-video call for a communication device.

BACKGROUND OF THE INVENTION

Push-To-Talk ("PTT") service is commonly found in two-way radio systems including a public safety radio communication system for police, dispatch radio systems for businesses, and more recently, cellular telecommunication systems. The PTT service provides one-to-one, or one-to-many, audio communication in wireless communication systems. With the PTT service, one party can communicate to other parties in a one-to-many call by pressing a PTT key. For example, in a police radio communication system, PTT can be used to send out a call from a central station to all available police officers, and a police officer responding to the call can send out a reply to all other police officers and to the central station. Similarly, Push-To-Video ("PTV") service provides one-to-one, or one-to-many, video and audio communication service in wireless communication systems. Because the video communication service provided by PTV may contain audio portion as well as video, it is desirable to able to control the audio and video portions of PTV communication.

DETAILED DESCRIPTION OF THE PREFERRED EMBODIMENTS

Figure 1:
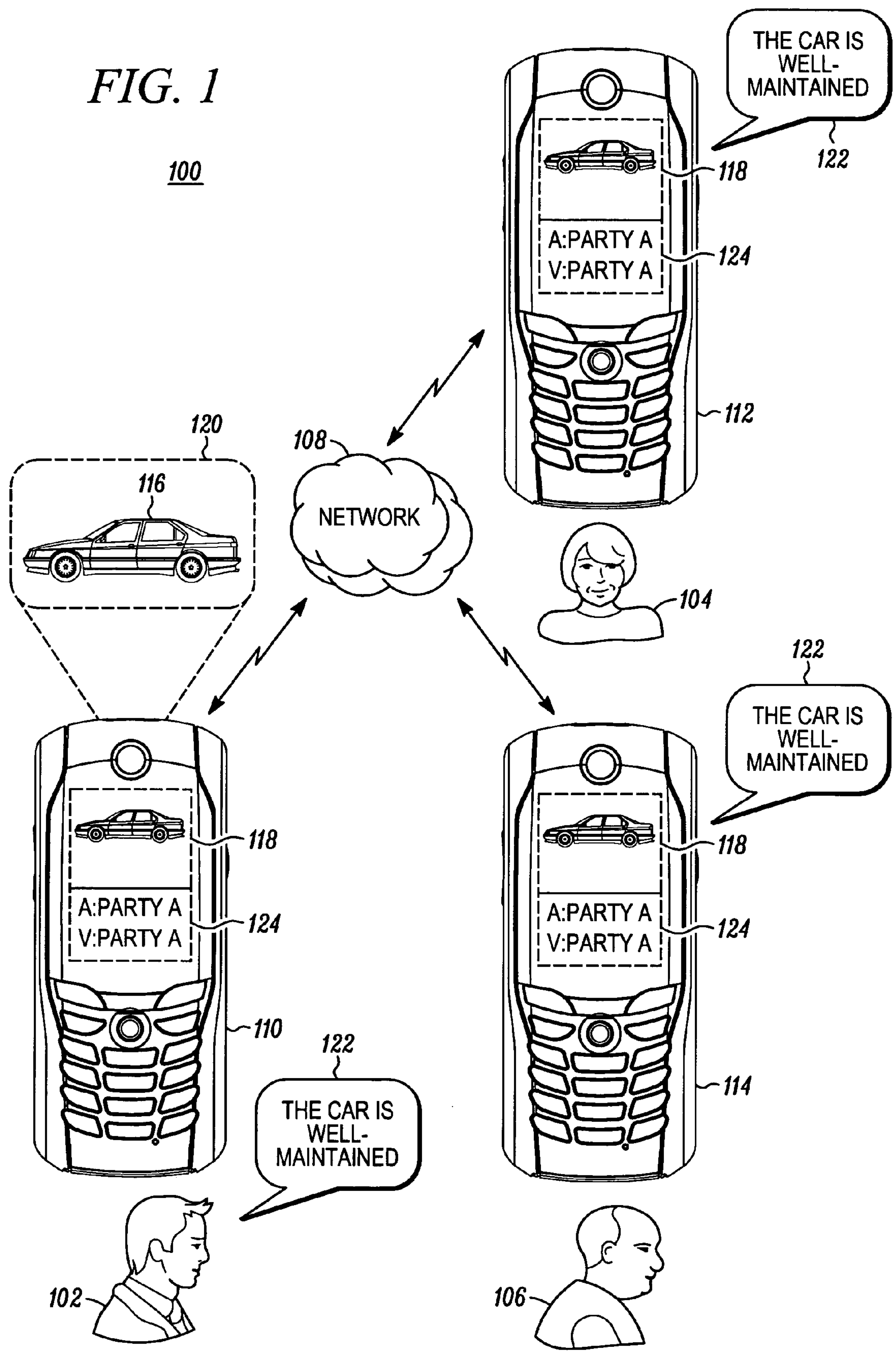
FIG. 1 is an exemplary environment in which a push-to-video communication device in accordance with at least one of the preferred embodiments is illustrated to have initiated and established a push-to-video communication.

A method and apparatus for a communication device for controlling an image portion and audio portion of a video communication utilized in a push-to-video communication, which allows one-to-one or one-to-many communication, are disclosed. FIG. 1 is an exemplary environment 100 where at least one of the preferred embodiments may be practiced. In FIG. 1, Party A 102 initiates a push-to-video call to a group of parties, for example, party B 104 and party C 106 through a communication network 108, such as a cellular communication network. When the push-to-video communication is established, Party A 102, more specifically, the communication device 110 of Party A 102, is initially in control of both image and audio portions of the push-to-video communication. Both image and audio portions of the push-to-video communication are transmitted from the originator's communication device 110, and parties B 104 and C 106 are able to see and hear the image and audio portions transmitted from Party A's communication device 110 with their respective communication devices 112 and 114. For example, if Party A 102 has a car 116 for sale and wants to show a live picture of the car 116, then the video communication may have the image portion 118 of the car 116 on all the communication devices 110, 112, and 114 being a live picture 120 captured by the originator's communication device 110, as shown in FIG. 1, with Party A 102 providing narration as the audio portion 122. Each communication device 110, 112, and 114 also provides an indication of who has the control of the image portion 118 and the audio portion 122 in an indicator field 124.

Figure 2:
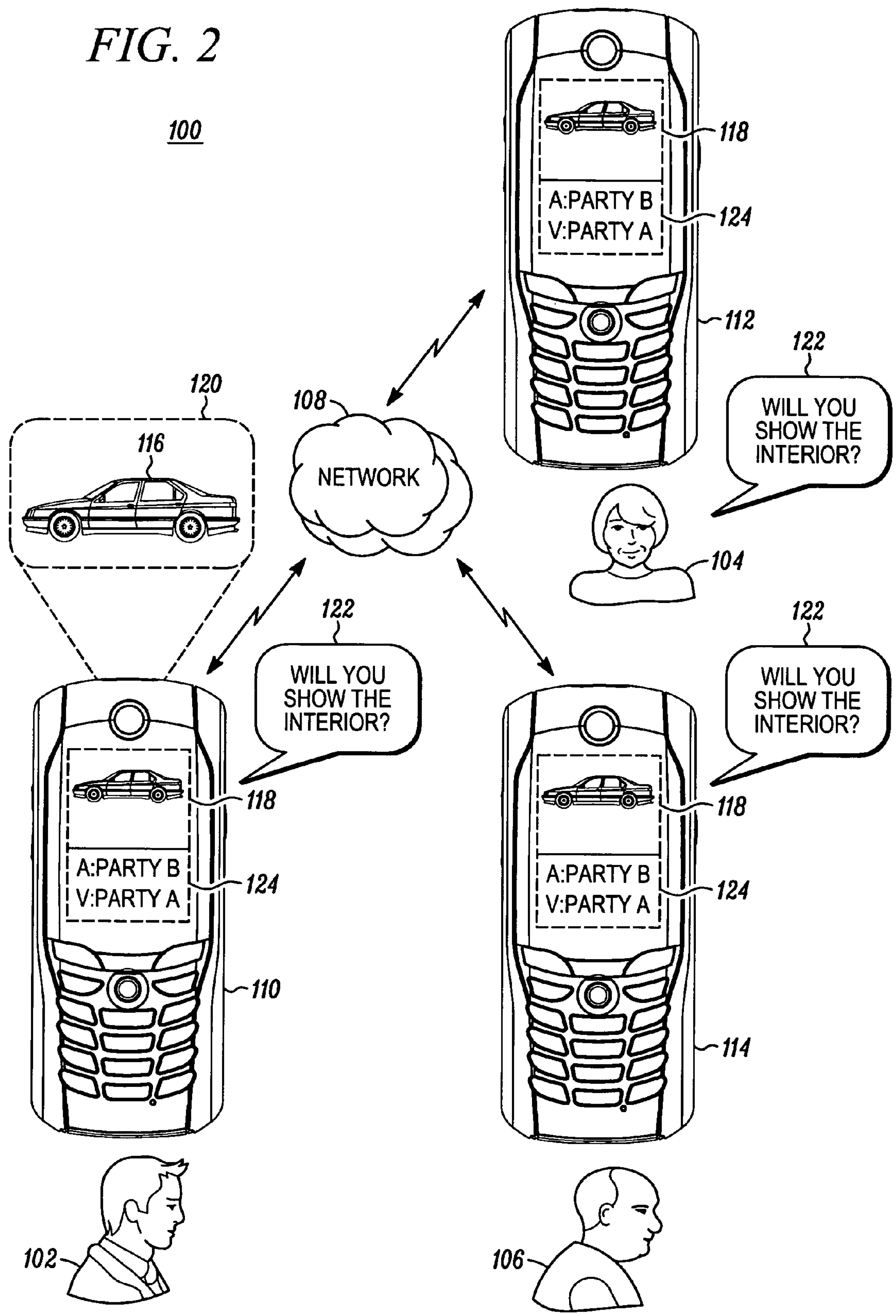
FIG. 2 is the exemplary environment of FIG. 1 in which the push-to-video communication device in accordance with at least one of the preferred embodiments is illustrated to have surrendered partial control of the push-to-video communication.

Control of one or both of the image portion 118 and audio portion 122 can be then made available for any one of the parties involved in the video communication. For example, as shown in FIG. 2, Party B 104 may take the control of the audio portion 122 while leaving the image portion 118 in control of Party A 102 such that the image portion 118 being displayed on all communication devices 110, 112, and 114 is provided by Party A's communication device 110 but the audio portion 122 heard by all parties are now being provided by Party B 104 through the communication device 112 of party B 104. The indicator field 124 of each communication device 110, 112, and 114 now reflects the change in the control of the audio portion 122 of the video communication. Similarly, party B 104 may take control of the image portion 118 while leaving the audio portion 122 in control of the originator's communication device 110, or party B may take control of both image and audio portions.

Figure 3:
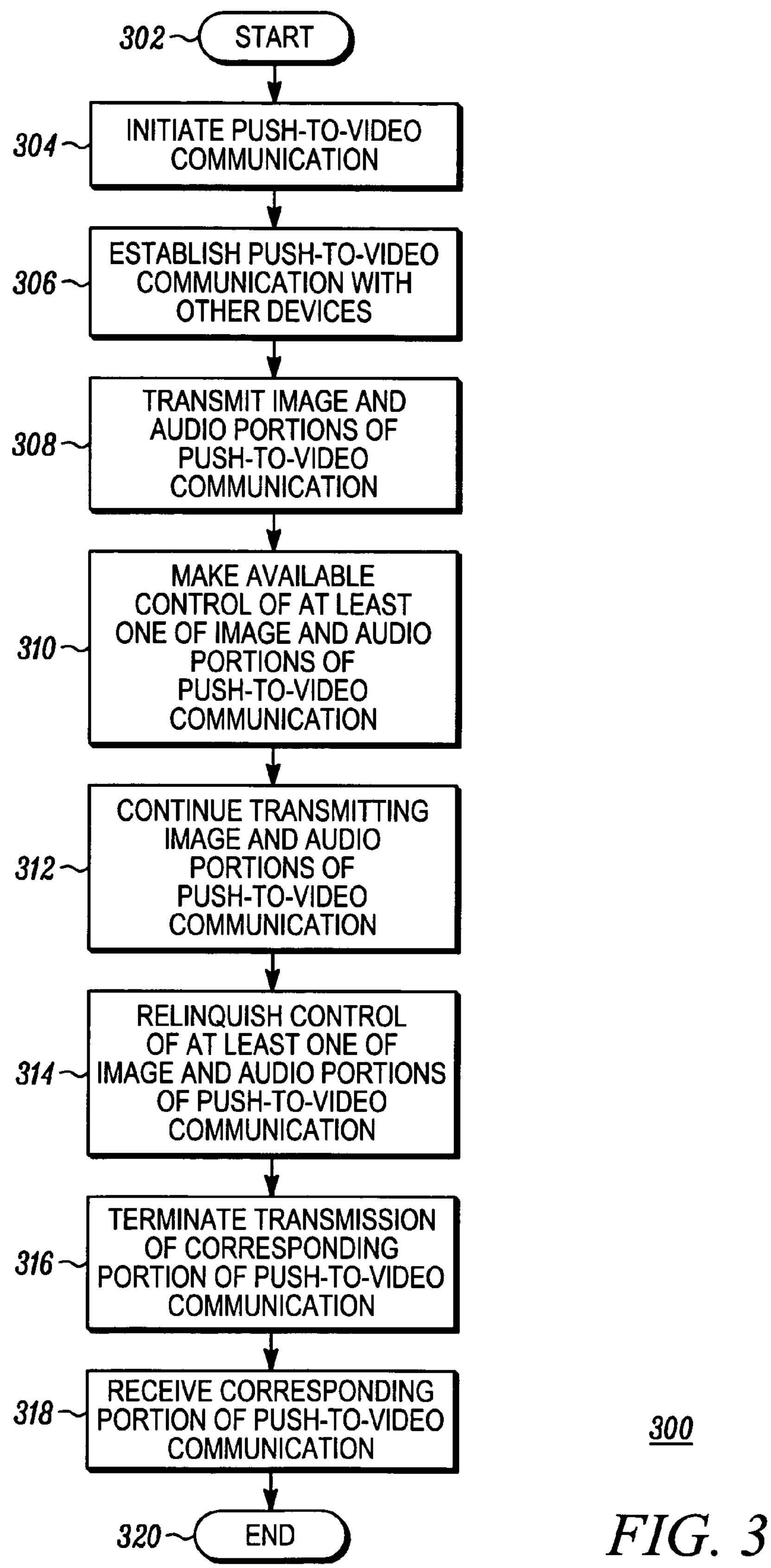
FIG. 3 is an exemplary flowchart for controlling an image portion and an audio portion of a push-to-video communication in accordance with at least one of the preferred embodiments.

FIG. 3 is an exemplary flowchart 300 for controlling an image portion and an audio portion of a push-to-video communication in accordance with at least one of the preferred embodiments. The process begins in block 302. A communication device, such as the communication device 110 of Party A 102 in FIG. 1, initiates a push-to-video communication in block 304, and establishes the push-to-video communication with other communication devices such as the communication devices 112 and 114 in block 306. The established push-to-video communication has an image portion such as the image portion 118, and an audio portion such as the audio portion 122 as previously illustrated in FIG. 1. In block 308, the communication device 110 transmits the image portion 118 and the audio portion 122 of the push-to-video communication. Although the image portion 118 of the push-to-video communication in FIGS. 1 and 2 is illustrated as a live image captured by the communication device 110, the image portion 118 may be a recorded image stored in the communication device 110 including a still image and a streaming video. The audio portion 122 of the push-to-video communication may include a recording stored in the communication device 110 in addition to a live audio captured by the communication device 110 as illustrated in FIGS. 1 and 2.

In block 310, the communication device 110 then makes control of one or both of the image portion 118 and the audio portion 122 of the push-to-video communication available to other communication devices, such as the communication devices 112 and 114, involved in the push-to-video communication. The communication device 110 may make the control of either or both of the image portion 118 and the audio portion 122 of the push-to-video communication available in response to receiving a request to relinquish control of either or both of the image portion 118 and the audio portion 122. The communication device 110, however, maintains the control of both of the image portion 118 and the audio portion 122 of the push-to-video communication, and continues to transmit both of the image portion 118 and the audio portion 122 of the push-to-video communication in block 312. The communication device 110 may provide an indicator, which may shows which device or user currently has the control or ownership of the video portion 118 and the audio portion 122, which portion of the push-to-video communication is available for any user involved to take the control, and which device or user is requesting to take the ownership of either or both portions of the push-to-video communication. When one of the communication devices, takes the control of one of the image portion 118 and the audio portion 122, the communication device 110 relinquishes the corresponding control over the push-to-video communication in block 314. For example, as illustrated in FIG. 2, the communication device 110 relinquishes the control of the audio portion 122 of the push-to-video communication when the communication device 112 takes the control of the audio portion 122 of the push-to-video communication. When the communication device 110 relinquishes the control of one of the image portion 118 and the audio portion 122, it terminates the transmission of the corresponding portion of the push-to-video communication in block 316, and begins to receive the corresponding portion of the push-to-video communication from the communication device which has taken the control of the corresponding portion in block 318. The process then terminates in block 320.

Figure 4:
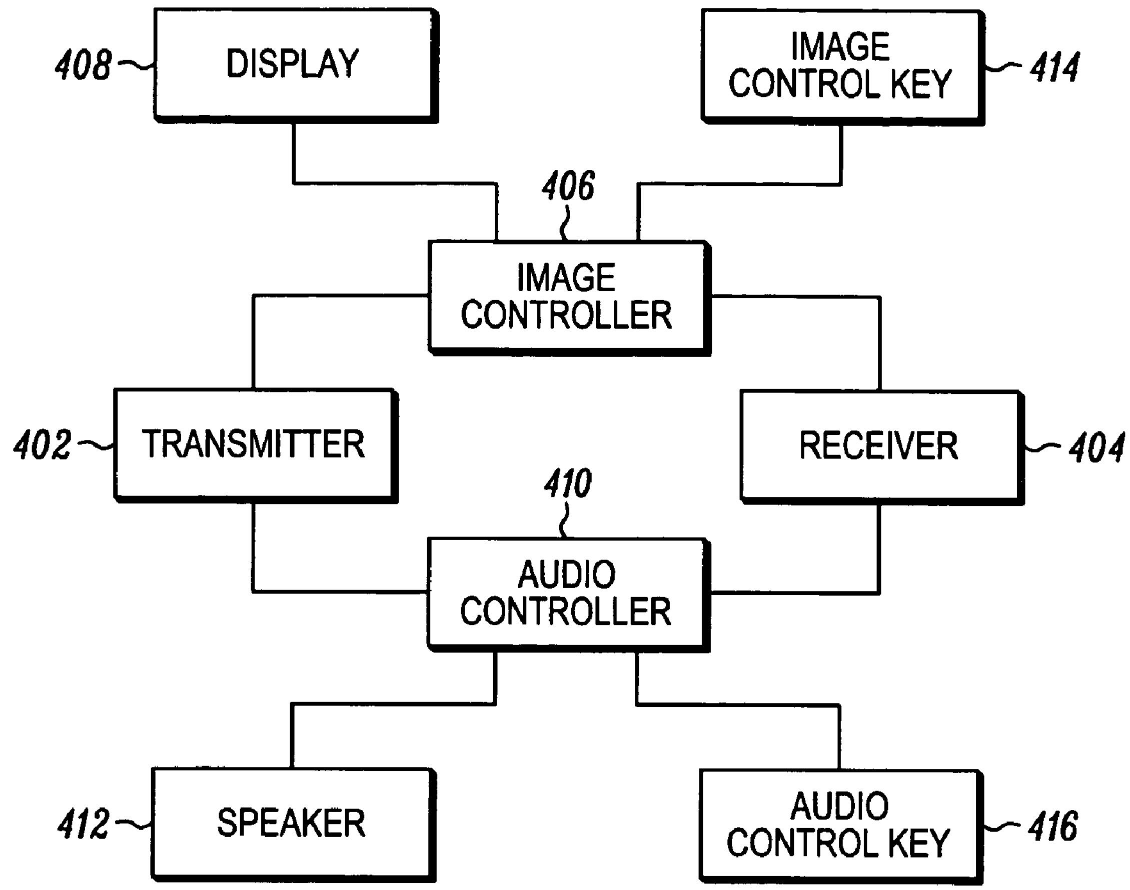
FIG. 4 is an exemplary block diagram of a communication device capable of push-to-video communication in accordance with at least one of the preferred embodiments.

FIG. 4 is an exemplary block diagram of the communication device 110 capable of a push-to-video communication in accordance with at least one of the preferred embodiments. The communication device 110 has a transmitter 402, which is configured to transmit an outbound image portion and an outbound audio portion of the video communication such as the image portion 118 and the audio portion 122 as previously illustrated in FIG. 1. Although the image portion 118 of the push-to-video communication in FIGS. 1 and 2 is illustrated as a live image captured by the communication device 110, the image portion 118 may be a recorded image stored in the communication device 110 including a still image and a streaming video. The communication device 110 also has a receiver 404, which is configured to receive an incoming image portion and an incoming audio portion of the push-to-video communication. An image controller 406 is coupled to both the transmitter 402 and the receiver 404, and is configured to determine whether to transmit the outbound image portion of the push-to-video communication. A display 408, which is coupled to the image controller 406, is configured to display the outbound image portion of the push-to-video communication. An audio controller 410 is also coupled to both the transmitter 402 and the receiver 404, and is configured to determine whether to transmit the outbound audio portion of the push-to-video communication. The outbound audio portion of the push-to-video communication may include a recording stored in the communication device 110 in addition to a live audio captured by the communication device 110 as the audio portion 122 illustrated in FIGS. 1 and 2. A speaker 412 is coupled to the audio controller 410, and is configured to communicate the incoming audio portion of the push-to-video communication.

The communication device 110 further has an image control key 414, which is coupled to the image controller 406 and is configured to generate an image transmit signal and an image receive signal. The image transmit signal is configured to direct the image controller 406 to transmit the outbound image portion of the push-to-video communication, and the image receive signal is configured to direct the image controller 406 to receive the incoming image portion of the push-to-video communication. The image controller 406 is further configured to direct the transmitter 402 to continue transmitting the outbound image portion of the push-to-video communication after the image receive signal is generated until the receiver 404 receives the incoming image portion of the push-to-video communication. The display 408 is further configured to display the incoming image portion of the push-to-video communication after the image receive signal, which directs the image controller 406 to receive the incoming image portion of the push-to-video communication, is generated.

The communication device 110 also has an audio control key 416, which is coupled to the audio controller 410 and is configured to generate an audio transmit signal and an audio receive signal. The audio transmit signal is configured to direct the audio controller 410 to transmit the outbound audio portion of the push-to-video communication, and the audio receive signal is configured to direct the audio controller 410 to receive the incoming audio portion of the push-to-video communication. The audio controller 410 is further configured to direct the transmitter 402 to continue transmitting the outbound audio portion of the push-to-video communication after the audio receive signal is generated until the receiver 404 receives the incoming audio portion of the push-to-video communication.

The display 408 may be further configured to display a source of a currently displayed image portion of the push-to-video communication and a source of a currently used audio portion of the push-to-video communication. The speaker 412 may be further configured to communicate the recorded audio as the outbound audio portion of the push-to-video communication.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a communication device for controlling an image portion and an audio portion of a push-to-video communication, the method comprising:

initiating the push-to-video communication;

establishing the push-to-video communication;

transmitting the image portion and the audio portion of the push-to-video communication; and making available control, by the communication device, for transmitting the image portion without the audio portion of the push-to-video communication.

2. The method of claim 1 further comprising:

maintaining the control of the at least one of the image and audio portions of the push-to-video communication; and continuing to transmit the at least one of the image and audio portions of the push-to-video communication.

3. The method of claim 2 further comprising:

relinquishing the control of the at least one of the image and audio portions of the push-to-video communication.

4. The method of claim 3, wherein relinquishing control of the at least one of the image and audio portions of the push-to-video communication includes terminating the transmission of the at least one of the image and audio portions of the push-to-video communication

5. The method of claim 3 further comprising:

receiving a corresponding relinquished portion of the push-to-video communication.

6. The method of claim 1, further comprising:

displaying a status of the control of the at least one of the image and audio portions of the push-to-video communication.

7. The method of claim 6, wherein the displayed status of the control includes sources of the image portion and the audio portion of the push-to-video communication.

8. The method of claim 1 further comprising:

receiving a request to relinquish control of the at least one of the image and audio portions of the push-to-video communication before making available control of at least one of the image and audio portions of the push-to-video communication.

9. The method of claim 1, wherein the image portion of the push-to-video communication includes at least one of:

a recorded image stored in the communication device including a still image and a streaming video, and a live image captured by the communication device.

10. The method of claim 1, wherein the audio portion of the push-to-video communication includes at least one of:

a recording stored in the communication device, and a live audio captured by the communication device.

11. A method in a first communication device for controlling an image portion and an audio portion of a push-to-video communication, the method comprising:

establishing, by a first communication device, the push-to-video communications;

transmitting, by the first communication device, the image portion and the audio portion of the push-to-video communications;

making available control, by the first communication device, for transmitting the image portion without the audio portion of the push-to-video communications;

taking control, by a second communication device, of transmitting a first portion from the image portion and the audio portion of the push-to-video communications;

relinquishing control, by the first communication device, of transmitting the first portion;

maintaining control, by the first communication device, of transmitting a second portion from the image portion and the audio portion of the push-to-video communications, wherein the second portion is other than the first portion; and transmitting, by the second device, the first portion and simultaneously transmitting, by the first device, the second portion.

12. The method of claim 11, wherein the first portion is the image portion and the second portion is the audio portion of the push-to-video communication.

13. The method of claim 11, wherein the first portion is the audio portion and the second portion is the video portion of the push-to-video communication.

14. A method in a first communication device for controlling an image portion and an audio portion of a push-to-video communication, the method comprising:

establishing, by a first communication device, the push-to-video communications;

transmitting, by the first communication device, the image portion and the audio portion of the push-to-video communications;

making available control, by the first communication device, for transmitting the image portion without the audio portion of the push-to-video communications;

taking control, by a second communication device, of transmitting a first portion from the image portion and the audio portion of the push-to-video communications;

taking control, by a third communication device, of transmitting a second portion from the image portion and the audio portion of the push-to-video communications, wherein the second portion is other than the first portion;

relinquishing control, by the first communication device, of transmitting the image portion and the audio portion of the push-to-video communications; and transmitting, by the second device, the first portion and simultaneously transmitting, by the third device, the second portion.

15. The method of claim 14, wherein the first portion is the image portion and the second portion is the audio portion of the push-to-video communication.

16. The method of claim 14, wherein the first portion is the audio portion and the second portion is the video portion of the push-to-video communication.

* * * * *